Patented Apr. 21, 1936

2,038,357

UNITED STATES PATENT OFFICE 2,038,357

METHOD OF DEHYDRATING ALCOHOL

William J. Hale, Midland, Mich., and Leo M. Christensen, Ames, Iowa, assignors to The Chemical Foundation, Incorporated, New York, N. Y., a corporation of Delaware No Drawing. Application February 27, 1935, Serial No. 8,484

7 Claims. (Cl. 44—9)

This invention relates to a method of producing alcohol, and more particularly to an improved method of dehydrating alcohols and producing an alcoholized motor fuel.

It has been proposed heretofore to utilize as a motor fuel a blend of alcohol in gasoline. Such a product has been extensively used in Europe. The production of this type of product is attended with some difficulties. It is recognized, for example, that the alcohol employed must be substantially anhydrous and that, to insure a stable, homogenous product, blending agents may be employed. Blending agents which have been found to be effective are the higher alcohols such as propyl, isopropyl, butyl and isobutyl alcohols.

In the past the methods suggested and employed for dehydrating aqueous alcohol usually involved the employment of a hygroscopic substance such as caustic soda or glycerine which had a preferential affinity for the water of the aqueous alcohol. The specific treatment comprised contacting the aqueous alcohol, either in liquid or vapor phase, with the dehydrating agent. The segregation or separation of the pure alcohol from the aqueous constituent of the system involved protracted and carefully controlled distillation.

It has also been proposed to remove the water of aqueous alcohol by chemical rather than by physical methods. Thus it has been suggested to produce absolute alcohol by contacting aqueous alcohol with a metal carbide, such as calcium carbide, or a mixture of metal carbides. In these circumstances the water reacts with the carbide to form a gas, such as acetylene, and an insoluble metal hydroxide. Here, however, difficulties are encountered in attempting to completely separate the insoluble reaction products from the alcohol.

The present method, in sharp contradistinction to earlier processes, effects the dehydration of alcohol by chemically reacting the water of the system with an added substance to produce in statu nascendi a compound which not only is miscible with the alcohol but which presents the added advantages of increasing the calorific power and serving effectively as a blending agent when such alcohol is subsequently added to motor fuel.

The product produced according to the present invention therefore is substantially dehydrated alcohol in which a blending agent is homogeneously incorporated, and which agent is the product of reaction involving and taking up the water content of the aqueous alcohol.

An object of the present invention therefore is to devise a process of the character described in which, by a simple method, aqueous alcohol is substantially dehydrated and a blending agent concomitantly formed.

Another object is to provide a novel method of dehydrating alcohol.

A further object is to produce an improved motor fuel.

Yet another object is to provide a novel method of incorporating a motor fuel blending agent in alcohol.

A still further object is to provide a simple method of improving the characteristics of alcohol designed for utilization as a motor fuel.

With these and other equally important objects in view, the invention comprehends the concept of treating aqueous alcohol under such circumstances and with such reagents that the water content thereof is employed in a type of hydration reaction to effect the formation, in situ, of the alcohol itself or a new compound having a beneficial effect when the alcohol is added to a light hydrocarbon oil for use as a motor fuel.

It is particularly to be noted that although stress is laid on the peculiar utility of the new product as a component of motor fuel, it has a much wider potential utility. As will be appreciated, the new product is available for use quite generally in the solvent field, as for example in producing solutions of resins, lacs and cellulose esters. Again, as will be apparent from a consideration of the product, it presents special utility as a solvent washing medium or precipitating agent in the several technological fields.

Considered more specifically, the present invention comprehends the concept of hydrating an alkyl oxide or ether with the water of aqueous alcohol to directly form the corresponding alkyl hydroxide or alcohol. The ether may be added to the starting material, i. e. the aqueous alcohol, in at least stoichiometrical amounts so as to substantially completely take up the water of the system and thus produce substantially anhydrous alcohol.

In practice our process is preferably conducted in a cyclic manner involving two distinct reactions carried out at separate points in the system. In the first reaction, an alcohol, e. g. ethyl, propyl, or a butyl alcohol, is dehydrated to form the corresponding ether. The latter is then added to aqueous alcohol and is caused to react with the water present to produce additional alcohol and at the same time render the alcohol anhydrous. The anhydrous alcohol so produced may be a single alcohol, or a mixture of alcohols, depending on whether or not the ether employed corresponds to the aqueous alcohol subjected to the treatment. A portion of said anhydrous alcohol product is then preferably subjected to the first of the above-mentioned reactions to produce a corresponding ether which is mixed with additional aqueous alcohol and the resultant mixture is subjected to the cyclic treatment just described.

In carrying out the invention therefore ethyl ether, propyl ether and/or butyl ether are prepared from their corresponding alcohols. This may be achieved by passing such alcohols through a reaction zone in contact with alumina, thoria, clay and other dehydrating agents at a temperature of approximately 200°–300° C.

The ether thus prepared is then added to aqueous alcohol in sufficient excess amount to react with substantially all the water present and displace the reaction towards the alcohol side. The present treatment relates particularly, although by no means exclusively, to the treatment of what is generally known as cologne spirits, that is aqueous alcohol containing approximately 5% of water. It will readily be appreciated, however, that more dilute alcohol solutions may be employed, requiring only the proper additional quantity of ether to combine with the water.

The mixture of the aqueous alcohol and ether is then passed through a suitable designed reaction zone and is therein contacted with hydrative catalysts, such as thoria, alumina, kaolin or similar agents at a temperature of the order of 200°–300° C. In these circumstances the ether is hydrated to the corresponding alcohol. The quantity of ether in the entering mixture, the speed of flow and temperature are so controlled as to insure substantially complete utilization of the water present in the system. The reaction may be carried out at any desired superatmospheric pressure. The effluent vapors are subjected to fractional condensation to remove the unreacted excess ether.

The product resulting from such treatment thus comprises substantially anhydrous ethyl alcohol itself or substantially anhydrous ethyl alcohol containing five percent more or less of higher alcohols, such as propyl, isopropyl, butyl and/or iso-butyl alcohols. As will be appreciated by those skilled in the art, the secondary alcohols are more readily formed than the primary alcohols under the conditions of the present process.

This product may be employed, as noted above, in admixture with light hydrocarbon oils, such as gasoline, to provide an improved carbureting mixture; a particularly effective fuel comprising approximately 90% gasoline and 10% alcohol is prepared according to the present invention.

In commercial operation a portion of the end product above defined, that is the anhydrous alcohol itself or anhydrous alcohol containing five or more percent of higher alcohols, is used in the first stage of the process for the production of mixed ethers. Thus this product in vapors phase is contacted with thoria or similarly acting catalyst and at a temperature of approximately 200°–300° C. As a result the mixed ethers are produced. A predetermined quantity of such mixed ether in sufficient excess, is then added to the aqueous alcohol to be treated so as to substantially completely use up and bind the water therein. Upon hydration of that fraction of these mixed higher ethers, which corresponds to the water content of the alcohol used, the corresponding alcohols are formed.

In the first step of the process, that is the preparation of ethers from alcohols, it is desirable, as pointed out above, to operate at temperatures between 250° and 300° C. If the temperature is increased material above this, unsaturated hydrocarbons, such as ethylene, butylene and propylene are formed. It is to be observed however that the presence of a small quantity of such unsaturated hydrocarbons in the final motor fuel is advantageous. In commercial operations however, it is advisable to keep within the temperature range noted.

It is also to be noted that the dehydration and hydration reactions proceed at different speeds. Thus the reaction involving the dehydration of an alcohol to the corresponding ether is relatively rapid while the hydration of an ether to its alcohol is somewhat slower.

In the above-described preferred mode of operation, increased economies and speed are insured by coupling the two reaction zones in a cyclic process. Thus the ether-aqueous alcohol mixture receives its supply of ether from the ether dephlegmate of the effluent of the first reaction zone. The make-up supply of the ether used is prepared by passing a portion of the alcohol produced in the first reaction zone through another tube properly charged with the dehydrative catalyst. The effluent from this latter tube is treated to remove the water formed and the ether, properly dried, is admitted to the feed entering the first reaction zone.

It will be appreciated that in lieu of utilizing such tube and catalyst for the dehydration of alcohol, such alcohol can be dehydrated by other methods such as passage through sulphuric, phosphoric or benzene sulphonic acid at a temperature of approximately 150° C.

The operation of the process will be more readily appreciated from a consideration of the following examples:

Example I

A catalyst of alumina was prepared by completely acidifying a solution of sodium aluminate with the theoretical quantity of sulphuric acid and washing the resulting precipitate with hot distilled water. This product was then dried at 400° C. for approximately two hours. The resulting granular material was placed in a combustion tube and directly employed in this form. A mixture of 100 cc. of aqueous ethyl alcohol (95% alcohol) and 500 cc. of ethyl ether was vaporized and passed through the combustion tube at a temperature of 240° C. The entire volume of the mixture was passed through the tube in a period of about 40 minutes. The effluent vapors were subjected to fractional condensation to separate the alcohol and ether fractions. The alcoholic fraction upon analysis, was found to contain 1% of water.

Example II

A catalyst, prepared according to Example I, was employed and this was contacted, in a combustion tube, with a vaporous mixture consisting of 100 cc. of 95% ethyl alcohol and 300 cc. of isopropyl ether. The entire volume was passed through the tube in between 30 to 40 minutes while a temperature of approximately 240° C. was maintained. The effluent vapors were separated into an alcoholic and ether fraction. Upon analysis, the alcoholic fraction was found to contain .75% of water.

Example III

A combustion tube was charged with freshly prepared thoria and to this was admitted a vaporous mixture consisting of 100 cc. of ethyl alcohol and 300 cc. of isobutyl ether. The vapors were passed through the tube in approximately 40 minutes while a temperature of 240° C. was maintained. The alcoholic fraction was condensed and upon analysis, was found to contain less than .5% of water.

Example IV

A vaporous mixture of 100 cc. of ethyl alcohol and 300 cc. of ethyl ether was passed through a combustion tube as in Example I. The effluent vapors were fractionated. Upon analysis, the alcoholic fraction was found to contain 2.1% of water. This alcoholic fraction was then mixed with 3 times its volume of normal butyl ether and the experiment repeated. Upon separation and analysis, it was found that the resulting alcoholic fraction contained .25% of water.

Whenever desired, or when the circumstances so require, the last trace of water can be removed by repeated treatment with ether, according to Example IV. Thus a further treatment of the second alcoholic fraction, produced according to Example IV, upon admixture with three times its volume of normal butyl ether, resulted in a further conversion, the alcoholic fraction of which showed a water content of less than .1%.

It will be appreciated that final traces of water may likewise be removed by other methods, as for example, by treatment of the alcoholic fraction by easily hydrolyzable compounds such as acetic anhydride. In these circumstances, the anhydride is converted to the acid and such acid may readily be removed by simple distillation methods. Or again, such last traces of water may be removed by addition, to the alcoholic fraction, of such compounds as methyl acetate. In these circumstances, the acetate is hydrolyzed to methyl alcohol and acetic acid. The acetic acid may be removed from the methyl alcohol-ethyl alcohol mixture by distillation.

As will be observed, the process is designed for and is particularly effective with cologne spirits or alcohol solutions of this generic type. However, it will be appreciated that the principles of the invention may be employed in any circumstances where it is desired to provide a mixture constituting a major percentage of ethyl alcohol and a minor percentage of higher alcohols. For example, if it is desired to prepare a blending agent for motor fuel, starting with absolute alcohol, the process may be carried out in the manner described with the preliminary addition of a given quantity of water to the alcohol or ether employed.

Similarly, as pointed out hereinbefore, the principles of the invention are applicable wherever a product having the characteristics defined herein is desired. For example, the present process may be employed where it is desired to prepare special alcoholic solvents for whatever use desired.

Therefore, while a preferred embodiment of the invention has been described and a preferred commercial utilization of the novel product indicated, it is to be understood that this is given merely to explain the underlying principles of the invention and to indicate the utility thereof and not as defining the exclusive method of production or the exclusive use of the product.

I claim:

1. In a method of dehydrating an aqueous alcohol, the step which consists in reacting water present in said alcohol with an alkyl ether, in vapor phase, in the presence of a hydrative catalyst and at temperatures in excess of 150° C. and up to substantially 300° C. to insure substantially complete hydration of the ether, whereby water is eliminated by conversion of the ether to alcohol.

2. In a method of dehydrating an aqueous alcohol, the step which consists in heating said aqueous alcohol with an alkyl ether, in vapor phase, at a temperature between about 200° and about 300° C. in the presence of a hydrative catalyst.

3. In a method of dehydrating an aqueous alcohol, the step which consists in contacting a vaporized mixture of said aqueous alcohol and an alkyl ether under pressure and at a temperature between about 250° and about 300° C. with a hydrative catalyst selected from the class consisting of thoria, alumina, and kaolin, whereby the ether and water are reacted with formation of additional alcohol.

4. In a method of dehydrating aqueous ethyl alcohol, the steps which consist in mixing said aqueous alcohol with alkyl ether in amount representing at least the chemical equivalent of the water present and passing the resultant mixture in vapor state under pressure and at a reaction temperature between about 200° and about 300° C. into contact with a hydrative catalyst selected from the class consisting of thoria, alumina, and kaolin.

5. In a cyclic method of dehydrating an aqueous alcohol, the steps which consist in reacting water of said aqueous alcohol with an alkyl ether in vapor phase, in the presence of a hydrative catalyst and at temperatures between 150° C. and approximately 300° C. whereby the ether is hydrated and additional alcohol is formed, converting a portion of the resultant substantially anhydrous alcohol product to the corresponding ether, mixing the latter with additional aqueous alcohol, and treating the resultant mixture in accordance with the steps set forth above.

6. In a continuous cyclic method of dehydrating aqueous ethyl alcohol, the steps which consist in passing a vapor mixture of said aqueous alcohol and an alkyl ether in amount at least chemically equivalent to the water present in continuous flow and under superatmospheric pressure through a body of a comminuted hydrative catalyst heated to a temperature between about 250° and about 300° C., whereby additional alcohol is formed and the alcohol is rendered substantially anhydrous by reaction between said ether and water, passing a portion of the substantially anhydrous alcohol product in vapor state through a comminuted body of a dehydrative catalyst heated to a temperature between about 250° and about 300° C., whereby the alcohol is at least partially converted to the corresponding ether, separating said ether from water produced by the treatment, mixing the ether with additional aqueous alcohol, and treating the resultant mixture in accordance with the steps set forth above.

7. In a cyclic method of dehydrating an aqueous alcohol, the steps which consist in reacting water of said aqueous alcohol with an alkyl ether in vapor phase, in the presence of a hydrative catalyst and at temperatures between 150° C. and approximately 300° C., whereby the ether is hydrated and additional alcohol is formed, passing a portion of the substantially anhydrous alcohol product into contact with a body of a dehydrative catalyst heated to a temperature above 250° C., whereby the alcohol is at least partially converted into an ether and an olefine, separating the ether and olefine from water produced by said treatment, mixing the ether and olefine with additional aqueous alcohol, and treating the resultant mixture in accordance with the steps set forth above.

WILLIAM J. HALE.
LEO M. CHRISTENSEN.